March 15, 1960 D. I. KOSOWSKY 2,929,031

INTERMEDIATE BAND WIDTH CRYSTAL FILTER

Filed Feb. 6, 1957

Inventor
David I. Kosowsky
by Robert S. Toperzer
Atty.

United States Patent Office 2,929,031

Patented Mar. 15, 1960

2,929,031

INTERMEDIATE BAND WIDTH CRYSTAL FILTER

David I. Kosowsky, West Newton, Mass., assignor to Hermes Electronics Co., Cambridge, Mass., a corporation of Delaware Application February 6, 1957, Serial No. 638,506

5 Claims. (Cl. 333—72)

This invention relates to frequency selective filters for electromagnetic waves and in particular it relates to band pass filters wherein piezoelectric crystals are employed as frequency sensitive elements.

As is well known, band pass crystal filters ordinarily fall into two distinct categories; namely, narrow band filters and wide band filters. In essence, a narrow band crystal filter is comprised of crystal resonators having two distinct resonant frequencies and anti-resonant frequencies which may be and often are effectively modified by the provision of external shunt capacitors. The most general form of network wherein the crystals are incorporated is the lattice network and in this form, as in other forms which may be derived from it, such as the "hybrid" transformer equivalent, one end of the pass band of the filter is defined by the resonant frequency or zero of a first one of the crystals, and the other end of the pass band is defined by the anti-resonant frequency or pole of the second crystal. Coincident with one another in the middle of the pass band are the other resonant and anti-resonant frequencies.

With this type of an arrangement, the maximum band width that can be obtained is equal to twice the zero-pole spacing $S^a$ of either crystal. Although $S^a$ may be decreased by the use of external shunt capacitances in combination with the crystals, it cannot be increased; as is apparent from the formula $$S_a=\frac{f_a}{2r}$$

where $f_a$=crystal resonant frequency
$C_0$=crystal shunt capacitance
$C_1$=crystal series capacitance, and $$r=\frac{C_0}{C_1}$$

It is a characteristic of crystal resonators that the ratio of the capacitances $C_0$ and $C_1$ cannot be made less than approximately 125 no matter what type of crystal cut is employed. In fact, at frequencies above one megacycle the minimum value of $r$ is more nearly double this amount. Therefore, in terms of frequency, the maximum band width that can be realized is ordinarily in the neighborhood of only .4 or .5 percent of the mid-band frequency.

In order to obtain crystal filters with wider band widths, the usual practice is to provide inductors either in series with the crystals or in parallel. Each combination including a crystal and an inductor then has two anti-resonant frequencies or poles instead of just the one associated with the crystal alone, and these are arranged, by appropriate choice of inductance values, to have equal and opposite displacements from the crystal resonant frequency. In a broad-band filter incorporating such crystal and inductance combinations, the anti-resonant frequencies of each crystal which are the more remote from one another are arranged to define the limits of the pass band, and all other critical frequencies are adapted to lie within the pass band. Band widths, equal to as much as 10 percent of the mid-band frequency, can be realized in this way but there is a minimum band width limitation imposed which depends upon the quality factor Q of the inductors. Since the maximum Q which can be obtained as a practical matter is limited, the minimum band width for which a broad band type filter can be designed is usually a little over 1 percent of the mid-band frequency.

It is the general object of the present invention to provide a band pass crystal filter having a pass band whose width is intermediate the minimum band width obtainable with a conventional broad band filter, and the maximum band width obtainable with a conventional narrow band filter.

It is a further object of the invention to provide a crystal filter of the aforementioned character which has no spurious pass band regions.

It is a still further object of the invention to provide a crystal filter of the aforementioned character wherein the effects of spurious modes of oscillation of the crystals are minimized.

The novel features of the invention, together with further objects and advantages thereof, will become apparent from the preferred embodiments of the invention illustrated in the drawing and described in detail hereinafter. In the drawing.

Figures 1, 2, 3, 4, 5, 6, 7, 8:
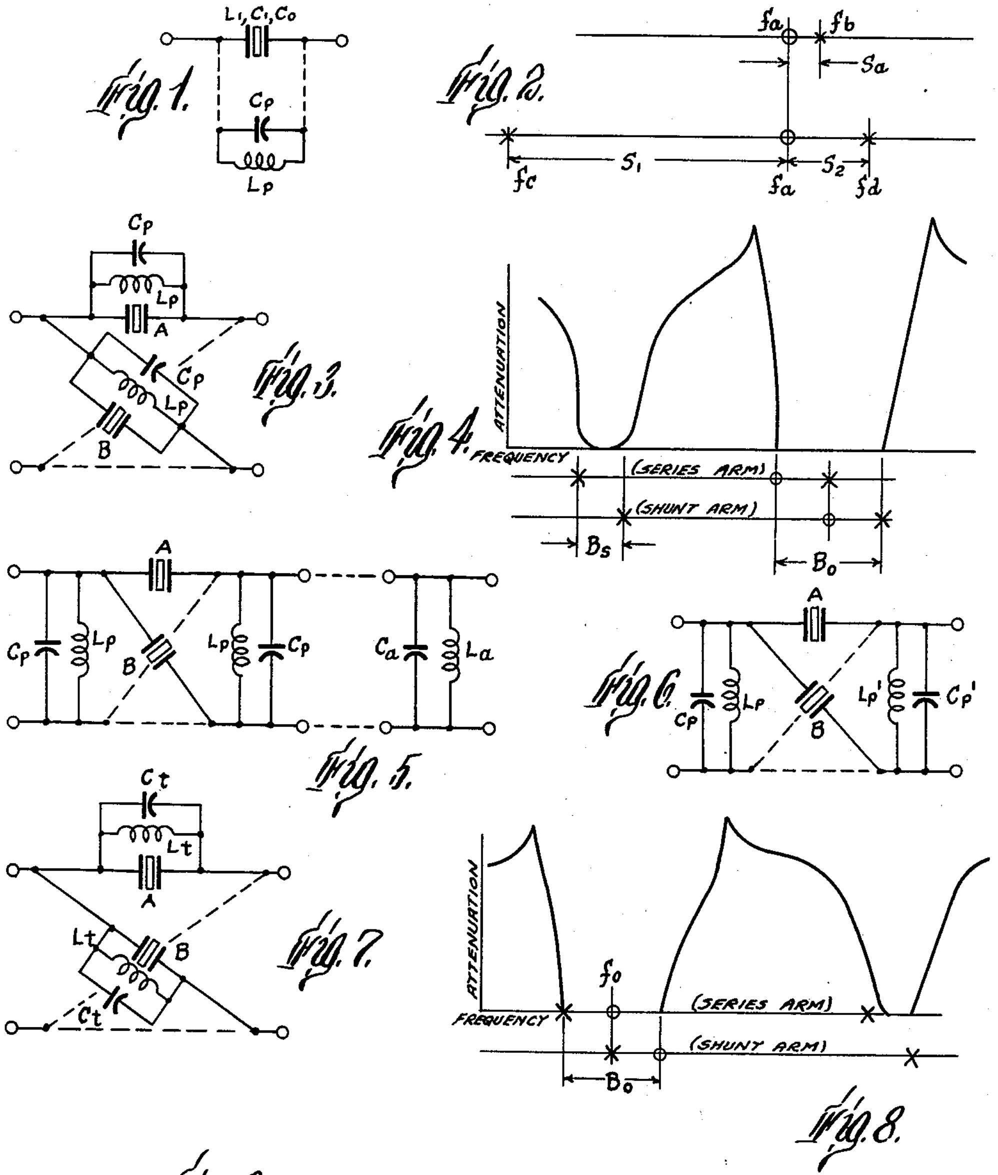
Fig. 1 is a diagram in schematic form of a portion of the filter network according to the invention.
Fig. 2 is a diagram to illustrate the frequency relation with respect to one another of the zeros and poles associated with the circuit of Fig. 1.
Fig. 3 is a schematic diagram of a filter network according to the invention.
Fig. 4 is a diagram illustrating the attenuation characteristic of the network of Fig. 3 as a function of frequency.
Figs. 5 and 6 are schematic diagrams illustrating a modification of the network of Fig. 3.
Fig. 7 is a schematic diagram of a further modification of the network of Fig. 3.
Fig. 8 is a diagram illustrating the attenuation characteristic of the network of Fig. 7 as a function of frequency.

In the drawing Fig. 1 illustrates schematically a piezoelectric element or crytal and a reactive circuit adapted to be connected in parallel therewith. The crystal is designated in terms of its equivalent series inductance $L_1$, series capacitance $C_1$, and shunt capacitance $C_0$; and the reactive circuit is characterized by an inductor $L_p$ and a capacitor $C_p$ connected in parallel with one another.

With reference now to Fig. 2, it will be observed that the crystal alone has a resonant frequency $f_a$ and an anti-resonant frequency $f_b$ separated in frequency by an amount designated $S_a$. As mentioned heretofore, it is the small value of $S_a$ associated with virtually all practically realizable piezoelectric elements which makes it impossible to obtain a filter of intermediate band width through an extension or narrow band filter techniques alone. According to the present invention, on the other hand, appropriate inductance and capacitance values are assigned to $L_p$ and $C_p$, respectively, such that an anti-resonant frequency $f_c$, is produced relatively widely spaced from $f_a$, and an anti-resonant frequency $f_d$ is produced having a substantially smaller spacing than $f_c$ but nevertheless greater than the zero pole spacing $S_a$ of the crystal itself. This is accomplished by making $L_p$ and $C_p$ resonant at a frequency slightly above the crystal resonant frequency $f_a$, so that at this latter frequency, they will simulate a very high inductance. The same result cannot be achieved conveniently through the use of a single inductor, because as a practical matter, such an inductor would be extremely difficult if not impossible to realize physically.

The design of an intermediate band width filter in accordance with the invention is based on the fact that if appropriate values are assigned to $C_p$ and $L_p$ as aforementioned, the spacing $S_2$ between $f_a$ and $f_d$ (Fig. 2) can be made equal to half the desired band width. When this is done, the spacing $S_1$ between $f_a$ and $f_c$ will be so large, that the latter has no effect on the desired pass band whatever. Thus, as shown in Fig. 3 the filter network is comprised of crystals A and B in the respective series and shunt arms of a lattice; and includes in parallel with each crystal a reactive circuit, as characterized in Fig. 1. The attenuation characteristic of the filter is shown in Fig. 4 and from Fig. 4 it will be observed that crystals A and B have their resonant frequencies (o) arranged to define the lower half, approximately, of the desired pass band region $B_o$, whereas the upper half of the desired band pass region is defined by one each of the anti-resonant frequencies or poles (x) associated with the respective crystal and reactive circuit combinations. In other words, if each arm of the lattice be regarded as an "effective" crystal having a single zero and a single pole such as $f_a$ and $f_b$, respectively, of Fig. 2, it is apparent the zeros and poles have been arranged in the manner of a conventional narrow band filter network. Since the zero pole spacing of both the series and shunt arms is now greater than would be the case in a conventional narrow band filter network, however, the result is that a correspondingly wider band width is obtained as desired.

Although one each of the poles associated with the respective series and shunt arms, have been disregarded; namely, those poles which are relatively distance from the passband, the fact is that they do give rise to a spurious response below the desired pass band as Fig. 4 indicates. Because of its correspondingly large displacement from the desired pass band, however, this spurious response or pass band $B_s$ may not be of consequence in many applications. In those applications where its presence is undesirable, the addition of an appropriate shunt capacitance $C_a$ and shunt inductance $L_a$ across one end of the network, as shown in Fig. 5, serves to eliminate the problem. The reason this is so may best be understood in terms of the equivalent network for the lattice configuration of Fig. 3 wherein $L_p$ and $C_p$ have been "taken out" of the lattice. This is illustrated in Fig. 5. When viewed in this light, the explanation for the spurious response $B_s$ (Fig. 4) is that each reactive circuit comprising $L_p$ and $C_p$ resonates with the lattice alone which, at a frequency in the region of $B_s$, has an equal and opposite reactance. In other words, when viewed from either its input terminals or its output terminals, the lattice itself is capacitive at all frequencies except those in the desired pass band $B_o$, and at some frequency below the desired pass band, where $L_p$ and $C_p$ act like an inductance, the value of this inductance and the value of the effective capacitance produced by the lattice itself become equal to one another, thereby creating a parallel resonance condition.

According to the invention this condition is eliminated by assigning values to $C_a$ and $L_a$ (Figs. 5 and 6) such that their reactances are equal and opposite at the mid frequency of the desired pass band $B_o$. The parallel resonant circuit which is thus formed will then have a very high reactance throughout the band $B_o$ and hence produce no noticeable effect on the filter attenuation characteristic in this region. In the vicinity of the spurious pass band $B_s$, however, $C_a$ and $L_a$ will have a relatively low inductive reactance thereby producing a substantial change in the frequency of resonance between the effective capacitance of the lattice and the reactive circuit comprising $L_p$ and $C_p$ disposed adjacent to $C_a$ and $L_a$. Since there is no corresponding circuit to modify $C_p$ and $L_p$ at the opposite end of the lattice, the net effect may be regarded as an effective staggering of the parallel resonance conditions arising from $L_p$ and $C_p$ which otherwise would occur at substantially the same frequency. As a result, the attenuation of the filter remains high throughout the frequency region below the pass band $B_o$ as well as above $B_o$.

It is, of corse, not at all necessary that $C_a$ and $L_a$ be embodied in separate reactive elements from $C_p$ and $L_p$. In Fig. 6 there is illustrated the same arrangement as that of Fig. 5 except that $L_p'$ and $C_p'$ denote respectively an inductor and a capacitor having values which include both $L_p$ and $L_a$ on the one hand, and $C_p$ and $C_a$ on the other.

Fig. 7 is an illustration of the same network as was described in connection with Fig. 3 except that the reactive circuits in parallel with respective crystals A and B are comprised of inductances and capacitances designated $L_t$ and $C_t$. In this case, values are assigned to $L_t$ and $C_t$ which are slightly lower than $L_p$ and $C_p$ to produce a zero and pole arrangement as shown in Fig. 8. From Fig. 8 it will be observed that the resulting attenuation characteristic is in effect the image of that shown in Fig. 4 which follows naturally from the fact that the positions of the poles and zeros in Fig. 8 are effectively reversed. Where spurious modes of oscillation of the individual crystals are a problem, the network of Fig. 7 has the advantage that the crystal resonant frequencies now define the upper half of the desired pass band rather than the lower half as was previously the case. Since spurious modes of crystal oscillation normally occur above the crystal resonant frequencies, it follows that the likelihood of such spurious responses falling within the pass band or very closely adjacent thereto is greatly reduced. By the same token, spurious responses which would otherwise give rise to spikes in that portion of the attenuation characteristic defining the pass band, and hence tend to degrade the attenuation characteristic, will be farther removed from this critical frequency region.

Of significance also is the fact that the spurious pass band is now above the desired pass band which may make its existence immaterial depending on the use to which the filter is put. If not, then the arrangement of Figs. 5 and 6 is equally applicable to the network of Fig. 7 as a means for eliminating the spurious pass band entirely.

Figure 9:
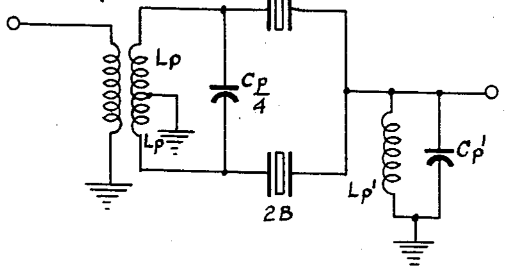
Fig. 9 is a schematic diagram of an equivalent of the network of Fig. 6.

Those skilled in the art will recognize that the network of Fig. 9 is the hybrid equivalent of the lattice network of Fig. 6. As described for example in my copending application Serial No. 595,179 filed July 2, 1956, equivalence is obtained by the assignment of appropriate values to the individual circuit elements. Briefly, the crystals 2A and 2B in Fig. 9 have twice the respective impedances of the crystals A and B of Fig. 3, and the secondary winding of the hybrid coil has a self inductance equal to twice $L_p$. Also, it will be observed, the capacitor in parallel with the secondary winding has one-fourth the value of $C_p$; as the notations in the drawing indicate.

Various such known transformations of the lattice networks illustrated herein by way of example to describe my invention are intended to be included within its scope and therefore what is claimed is:

1. A band-pass crystal filter network of the hybrid type including a transformer with at least a pair of balanced windings, at least one crystal connected to each winding, and a reactive circuit effectively disposed in parallel relation to each crystal, said reactive circuits each being comprised of an inductor and a capacitor connected in parallel with one another and having inductance and capacitance values, respectively, to produce at least a first anti-resonance condition at a first frequency located outside the filter pass band and displaced from the crystal resonant frequency by a substantial amount, and a second anti-resonance condition at a second frequency located within the filter passband.

2. A band-pass filter network according to claim 1 wherein said first and second reactive circuits are connected across the respective ends of the network.

3. A band-pass crystal filter network of lattice configuration comprising a pair of series arms and a pair of shunt arms, each of said arms including at least one crystal and a reactive circuit disposed in parallel relation to said crystal, said reactive circuits each being comprised of an inductor and a capacitor connected in parallel with one another and having inductance and capacitance values, respectively, to produce at least a first anti-resonance condition at a first frequency located outside the filter passband and displaced from the crystal resonant frequency by a substantial amount, and a second anti-resonance condition at a second frequency located within the filter passband.

4. A crystall filter network as claimed in claim 3 including a parallel resonant circuit connected across one end only of the network, said resonant circuit being tuned to approximately the middle of the filter passband.

5. A crystal filter network as claimed in claim 2 including a parallel resonant circuit effectively connected across one end only of the network, said resonant circuit being tuned to approximately the middle of the filter passband.

References Cited in the file of this patent

UNITED STATES PATENTS

| | | |
|---|---|---|
| 1,921,035 | Mason | Aug. 8, 1933 |
| 1,967,250 | Mason | July 24, 1934 |
| 2,045,991 | Mason | June 30, 1936 |
| 2,199,921 | Mason | May 7, 1940 |
| 2,216,937 | Ciccolella | Oct. 8, 1940 |
| 2,222,417 | Mason | Nov. 19, 1940 |
| 2,240,142 | Lovell | Apr. 29, 1941 |
| 2,267,957 | Sykes | Dec. 30, 1941 |
| 2,406,796 | Bies | Sept. 3, 1946 |
| 2,738,465 | Schramm | Mar. 13, 1956 |